(12) United States Patent
Enjalbert

(10) Patent No.: US 10,436,812 B2
(45) Date of Patent: Oct. 8, 2019

(54) MICRO-ELECTRO-MECHANICAL ACCELERATION SENSOR DEVICE

(71) Applicant: FREESCALE SEMICONDUCTOR, INC., Austin, TX (US)

(72) Inventor: Jerome Romain Enjalbert, Tournefeuille (FR)

(73) Assignee: NXP USA, Inc., Austin, TX (US)

( * ) Notice: Subject to any disclaimer, the term of this patent is extended or adjusted under 35 U.S.C. 154(b) by 11 days.

(21) Appl. No.: 14/980,735

(22) Filed: Dec. 28, 2015

(65) Prior Publication Data
US 2016/0274141 A1    Sep. 22, 2016

(30) Foreign Application Priority Data

Jul. 23, 2015   (WO) .................. PCT/IB2015/001571

(51) Int. Cl.
  *G01P 15/125*   (2006.01)
  *G01P 15/18*    (2013.01)
  *G01P 15/08*    (2006.01)

(52) U.S. Cl.
  CPC ............ *G01P 15/125* (2013.01); *G01P 15/18* (2013.01); *G01P 2015/0831* (2013.01)

(58) Field of Classification Search
  CPC .................. G01P 15/125; G01P 2015/0831
  See application file for complete search history.

(56) References Cited

U.S. PATENT DOCUMENTS

| | | | |
|---|---|---|---|
| 5,406,848 A * | 4/1995 | Okada | ...................... G01L 1/144 73/514.32 |
| 6,515,489 B2 * | 2/2003 | Min | ...................... B82Y 35/00 324/661 |
| 6,845,670 B1 | 1/2005 | McNeil et al. | |
| 7,258,011 B2 | 8/2007 | Nasiri et al. | |
| 7,487,661 B2 | 2/2009 | Ueda et al. | |
| 7,600,428 B2 | 10/2009 | Robert et al. | |
| 8,020,443 B2 | 9/2011 | Lin et al. | |
| 8,056,415 B2 | 11/2011 | Neil et al. | |
| 8,272,268 B2 | 9/2012 | Classen et al. | |
| 8,413,509 B2 | 4/2013 | Geisberger | |
| 8,468,887 B2 | 6/2013 | McNeil et al. | |
| 9,097,736 B2 | 9/2015 | Classen et al. | |

(Continued)

OTHER PUBLICATIONS

Tsai, Ming-han et al., "A Three-Axis CMOS-MEMS Accelerometer Structure With Vertically Integrated Fully Differential Sensing Electrodes" IEEE Journal of Microelectromechanical Systems, vol. 21, No. 6, Dec. 2012; pp. 1329-1337.

(Continued)

*Primary Examiner* — John E Chapman, Jr.
(74) *Attorney, Agent, or Firm* — Charlene R. Jacobsen

(57) ABSTRACT

A MEMS acceleration device for measurement of the acceleration along three axes. The device includes capacitors, which capacitance changes under the influence of an acceleration acting upon the device. The change of capacitance for acceleration parallel to the substrate are, normally used with distinct capacitors. This device combines capacitors for using the change in capacitance for sensing in two independent and different directions parallel to the substrate thereby reusing the capacitor. Thereby allowing shrinking of the device while maintaining substantially the same sensitivity.

12 Claims, 11 Drawing Sheets

(56) References Cited

U.S. PATENT DOCUMENTS

| | | | |
|---|---|---|---|
| 2005/0005698 A1* | 1/2005 | McNeil | G01P 15/125 |
| | | | 73/514.32 |
| 2006/0185433 A1 | 8/2006 | Leonardson et al. | |
| 2009/0183570 A1 | 7/2009 | Acar et al. | |
| 2010/0024552 A1 | 2/2010 | Foster | |
| 2010/0107763 A1 | 5/2010 | Lin et al. | |
| 2011/0154899 A1 | 6/2011 | Classen et al. | |
| 2011/0162453 A1 | 7/2011 | Wang et al. | |
| 2011/0174074 A1 | 7/2011 | Li et al. | |
| 2012/0000287 A1 | 1/2012 | Frangi et al. | |
| 2012/0036915 A1* | 2/2012 | Franke | G01P 15/125 |
| | | | 73/1.38 |
| 2014/0144235 A1 | 5/2014 | Suzuki | |
| 2015/0268269 A1 | 9/2015 | Jia et al. | |

OTHER PUBLICATIONS

Non-Final Office Action dated Apr. 4, 2016 for U.S. Appl. No. 14/221,016, 20 pages.

\* cited by examiner

MICRO-ELECTRO-MECHANICAL ACCELERATION SENSOR DEVICE

CROSS REFERENCE TO RELATED APPLICATION(S)

The present application claims priority to International Patent Application No. PCT/IB2015/001571, entitled "MICRO-ELECTRO-MECHANICAL ACCELERATION SENSOR DEVICE," filed on Mar. 20, 2015, the entirety of which is herein incorporated by reference.

FIELD OF THE INVENTION

The invention relates to the field of a micro-electromechanical system (MEMS) sensor device and system for measuring an acceleration, and specifically, a mechanism for accessing data from a MEMS device having a reduced number of capacitors for measuring forces along multiple axes.

BACKGROUND OF THE INVENTION

A known micro-electromechanical system (MEMS) measures the acceleration along three axes, which may be perpendicular to each other. Most of the time a set of axes is chosen from which two of the three axes are in the same plane as the die of the MEMS and one axis is perpendicular to the plane of the die.

The known MEMS requires twelve wires to route from the accelerometer structure to the sensing circuit and input modulation. The twelve wires are divided over differential input signals and differential output signals over the three axes. Hence the known MEMS requires to route four wires per axis.

A disadvantage of the known MEMS is that the size of the MEMS is too large, requiring a large die size and therefore having a high cost.

BRIEF DESCRIPTION OF THE DRAWINGS

These and other aspects of the invention will be apparent from and elucidated further with reference to the embodiments described by way of example in the following description and with reference to the accompanying drawings, in which FIG. 1 schematically shows a top view of an embodiment of a micro-electromechanical device.

The figures are purely diagrammatic and not drawn to scale. In the figures, elements which correspond to elements already described may have the same reference numerals.

DETAILED DESCRIPTION OF EMBODIMENTS

Figure 1:
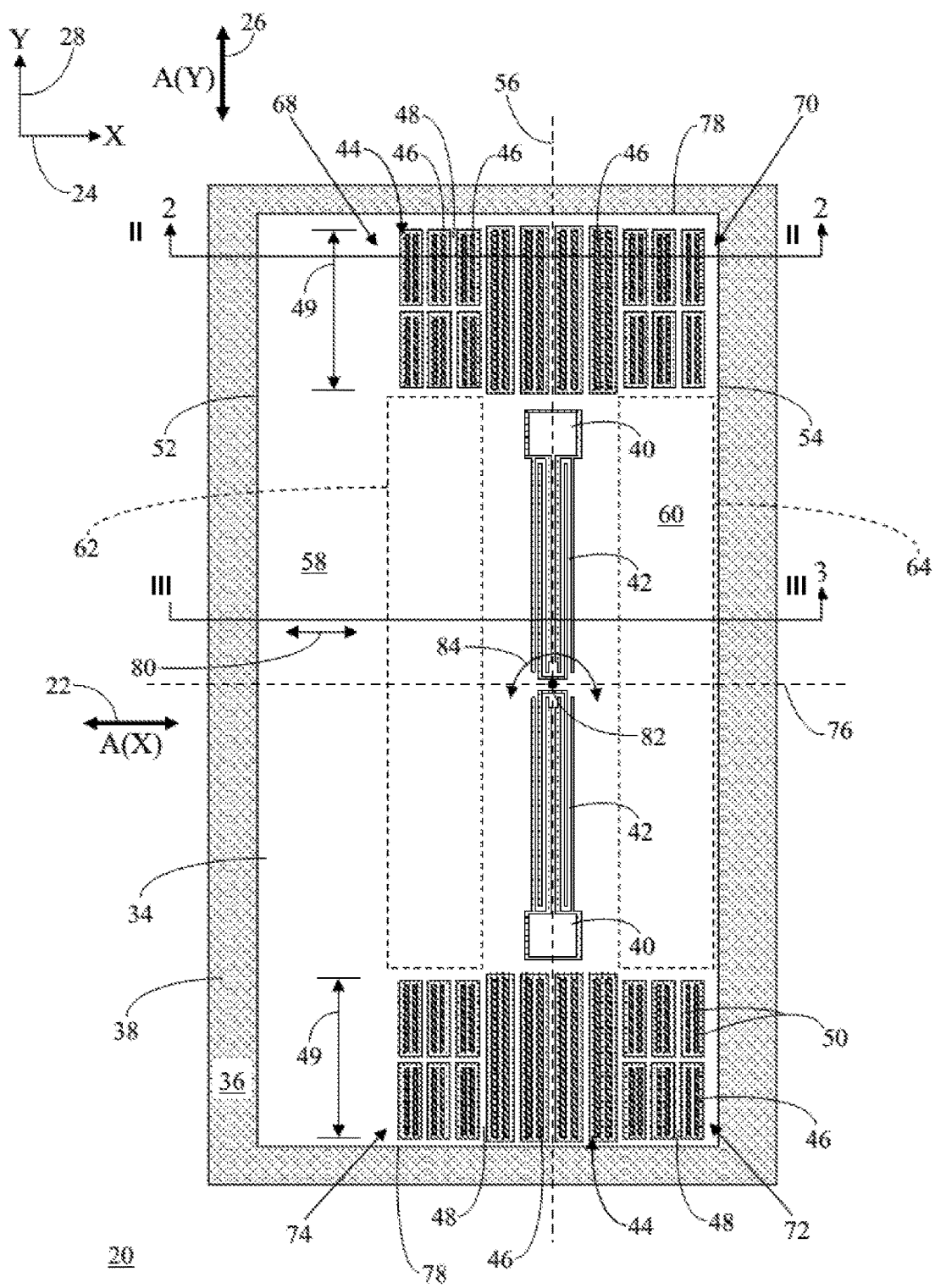

Embodiments of the present invention include capacitors having a capacitance that changes due to acceleration or force. The embodiments are configured to measure the acceleration or force by combining capacitors in different ways to allow for reuse of the capacitors for measuring the acceleration or force in different directions. The combining of capacitors may be done to sense forces along two perpendicular axes that are parallel to a face of the substrate. The reuse of capacitors allows for reduction in size or compact design of the MEMS sensor device while maintaining substantially the same sensitivity or even increasing the sensitivity of the MEMS sensor device compared to other MEMS sensor devices having the same size or a larger size or a combination wherein size reduction and sensitivity are balanced.

The different MEMS devices according to the invention are shown in the drawings and will herein be described in detail by one or more specific embodiments, with the understanding that the present disclosure is to be considered as exemplary of the principles of the invention and not intended to limit the invention to the specific embodiments shown and described. In the following, for the sake of understanding, elements of embodiments are described in operation. However, it will be apparent that the respective elements are arranged to perform the functions being described as performed by them.

FIG. 1 schematically shows a top view of an embodiment of a micro-electromechanical device according to the invention.

Embodiments of the invention entail a compact microelectromechanical system (MEMS) sensor, for example, an accelerometer, that is capable of sensing a force or acceleration along two or more axes. In particular, multiple axes sensing can be adapted to detect acceleration in two perpendicular axes that are parallel to a face of a substrate of the sensor. In some configurations, the MEMS sensor may be further adapted to detect acceleration along an axis that is perpendicular to the face of the sensor. A compact design with high sensitivity can be achieved by combining elements to sense the forces along the two perpendicular axes that are parallel to a face surface of the substrate of the sensor.

Figure 2:
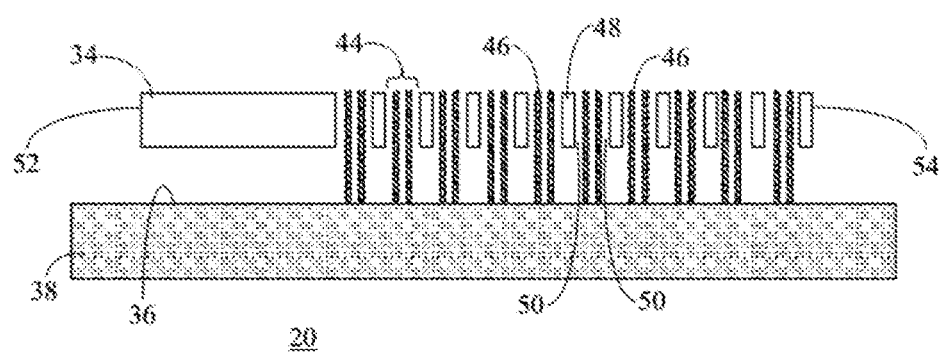
FIG. 2 schematically shows a cross section of the embodiment of the device of FIG. 1 along section line II-II.
Figure 3:
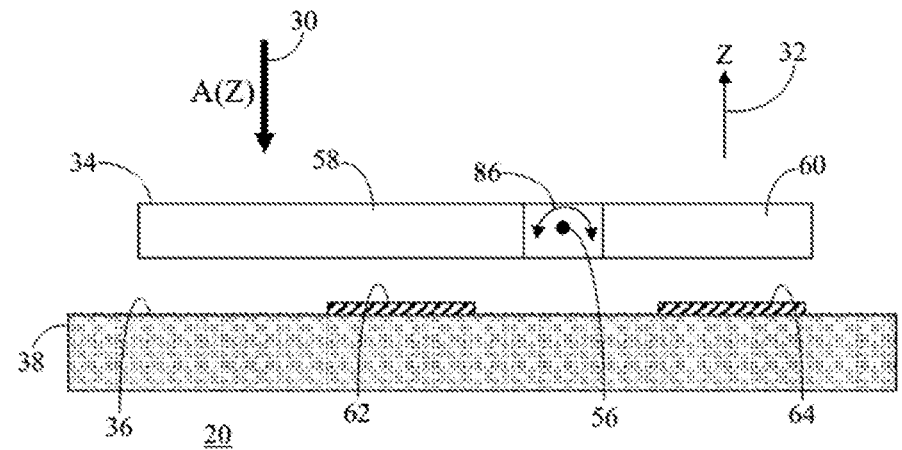
FIG. 3 schematically shows a simplified cross section of the embodiment of the device of FIG. 1 along section line III-III.

Referring now to FIGS. 1-3, FIG. 1 schematically shows a top view of an embodiment of a micro-electromechanical sensor device 20 or micro-electromechanical system (MEMS) sensor device. FIG. 2 schematically shows a cross section of the embodiment of the device of FIG. 1 along section line 2-2. FIG. 3 schematically shows a simplified cross section of the embodiment of the device of FIG. 1 along section line 3-3. Sensor device 20 may be, for example, an accelerometer or other MEMS sensing device. For purposes of the following discussion, sensor device 20 may be referred to hereinafter as accelerometer 20. However, sensor device 20 need not be an accelerometer, but may be any other MEMS sensor (e.g., gyroscope) adapted to sense a force along at least two mutually perpendicular axes, both of which are parallel to a face of the MEMS sensor.

In an embodiment, sensor device 20 is a multiple axes sensor adapted to detect a net force or acceleration along each of three perpendicular axes. As illustrated in FIG. 1, sensor device 20 is capable of detecting an X-axis acceleration stimulus or first force 22 (labelled A(X)), along an X-axis 24 in a three-dimensional coordinate system. Additionally, sensor device 20 is capable of detecting a Y-axis acceleration stimulus or second force 26 (labelled A(Y)), along a Y-axis 28 in the three-dimensional coordinate system. As further illustrated in FIG. 3, sensor device 20 is also capable of detecting a Z-axis acceleration stimulus or third force 30 (labelled A(Z)), along a Z-axis 32 in the three-dimensional coordinate system. Sensor device 20 achieves a compact configuration while concurrently providing significant capacitive output corresponding to acceleration stimuli 22, 26, and 30.

FIGS. 1-3 are illustrated using various shading or hatching to distinguish the different elements produced within the structural layers of MEMS sensor device 20, as will be discussed below. These different elements within the structural layers may be produced utilizing current and upcoming surface micromachining techniques of depositing, patterning, etching, and so forth. Accordingly, although different shading or hatching is utilized in the illustrations, the different elements within the structural layers are typically formed out of the same material, such as polysilicon, single crystal silicon, and the like.

The elements of sensor device 20 (discussed below) may be described variously as being "attached to," "attached with," "coupled to," "fixed to," or "interconnected with," other elements of sensor device 20. It should be understood that these terms refer to the direct or indirect physical connections of particular elements of sensor device 20 that occur during their formation through patterning and etching processes of MEMS fabrication. However, the terms "direct" or "directly" preceding any of the above terms refers expressly to the physical connection of particular elements of sensor device 20 with no additional intervening elements.

Sensor device 20 includes a movable body 34 spaced apart from a face 36 of a substrate 38. Suspension anchors 40 are formed on substrate 38 and compliant members 42 interconnect movable body 34 with suspension anchors 40 so that movable body 34 is suspended above substrate 38. Compliant members 42 enable movement of movable body 34 relative to face 36 of substrate 38.

A plurality of openings 44 extend through movable body 34. Pairs of substrate surfaces 46 reside in openings 44 and are attached to substrate 38 such that they are substantially immovable relative to face 36 of substrate 38. As particularly illustrated in FIG. 1, each of substrate surfaces 46 are oriented substantially parallel to one another. Additionally, substrate surfaces 46 of each pair are electrically, thus mechanically, isolated from one another in order to achieve differential sensing capability.

Substrate surfaces 46 are arranged adjacent to movable body surfaces 48, hence each substrate surface 46 and adjacent movable body surface 48 together constitute a capacitance. More particularly, portions of movable body 34 are positioned between, and therefore are adjacent to, substrate surfaces 46. These portions of movable body 34 are referred to herein as movable body surfaces 48 since they are capable of movement in conjunction with the remainder of movable body 34 relative to face 36 of substrate 38. The arrangement of substrate surfaces 46 and movable body surfaces 48 are substantially parallel to face 36 of substrate 38 and are oriented such that their length 49 is oriented perpendicular to X-axis 24, and capacitor gaps 50 are formed between each side of movable body surfaces 48 and the adjacent substrate surfaces 46.

Only a few substrate surfaces 46 and movable body surfaces 48 are shown for clarity of illustration. Alternative embodiments may include fewer or more than the pairs of surfaces 46, 48 illustrated herein. Regardless of the quantity of surfaces 46, 48, all substrate surfaces 46 in the illustrated embodiment and in alternative embodiments are oriented substantially parallel to one another and are consequently oriented substantially parallel to movable body surfaces 48.

Movable body 34 is a generally planar structure having opposing ends 52 and 54. A reference axis 56, oriented substantially parallel to Y-axis 28, is located between ends 52, 54 to form a section 58 of movable body 34 between reference axis 56 and end 52, and to form another section 60 of movable body 34 between reference axis 56 and end 54. Section 58 exhibits a relatively greater mass than section 60. This is typically accomplished by offsetting reference axis 56 such that section 58 is longer than section 60. However, in other configurations, the greater mass of section 58 relative to section 60 may be accomplished, where sections 58 and 60 are of relatively identical lengths, by adding mass to section 58, removing mass from section 60, or some combination thereof. However, in other configurations, the greater mass of section 58 relative to section 60 may be accomplished, where sections 58 and 60 are of relatively identical lengths, by making section 58 of a different material with a different density or unit weight, compared to section 60, or some combination thereof.

A MEMS sensor has a capacitor, which capacitor, having a capacitance, is formed by surfaces on both sides of a capacitor gap, wherein one side is a surface of a movable body and the other side is of a substrate of the MEMS sensor. An X-axis or a Y-axis movement of a movable body in reference to the substrate may change the capacitance. The movement of the movable body may be induced by an acceleration of the MEMS sensor or a force acting upon the movable body.

In the illustrated embodiment, reference axis 56 is a rotational axis. That is, movable body 34 is further adapted to rotate or pivot about reference axis 56 in response to Z-axis third force 30. As such, reference axis 56 is referred to hereinafter as rotational axis 56. A fifth substrate surface 62 is disposed on face 36 of substrate 38 opposing section 58, and another sixth substrate surface 64 is disposed on face 36 of substrate 38 opposing section 60. Fifth and sixth substrate surfaces 62, 64 are visible in the side view illustration of FIG. 3. However, fifth and sixth substrate surfaces 62, 64 are shown in dashed line form in FIG. 1 since they underlie movable body 34. Only one fifth and one sixth substrate surfaces 62, 64 are shown for simplicity of illustration. In alternative embodiments, sensor device 20 may include a different quantity or different configuration of substrate/electrode surfaces formed on substrate 38 opposing movable body 34. Fifth and sixth substrate surfaces 62, 64 with respective parts of the movable body may form capacitances for measuring acceleration in a Z direction.

Substrate surfaces 46 and movable body surfaces 48 are delineated into four groups of adjacent pairs of surfaces 46, 48. The groups of adjacent pairs of surfaces 46, 48 are referred to herein as a first group 68, a third group 70, a fourth group 72, and a second group 74 of adjacent pairs of surfaces 46, 48. In this example, a reference axis 76 coincides with a centreline of sensor device 20 and is parallel to X-axis 24. Another reference axis coincides with rotational axis 56 and is parallel to Y-axis 28. For simplicity, this second reference axis is variously referred to herein as reference axis 56 or rotational axis 56. Thus, both of reference axis 76 and rotational axis 56 are substantially parallel to face 36 of substrate 38, and rotational axis 56 is perpendicular to reference line 76. The terms "first," "second," "third," and "fourth" utilized herein are not necessarily intended to indicate temporal or other prioritization of such surfaces. Rather, the terms "first," "second," "third," and "fourth" are used to delineate separate features, such as groupings of surfaces 46, 48 for clarity of illustration.

In an embodiment, first and second groups 68, 74 are symmetrically positioned opposing one another on opposite sides of reference axis 76 and third and fourth groups 70, 72 are symmetrically positioned opposing one another on opposite sides of reference axis 76. Additionally, first and third groups 68, 70 are symmetrically positioned opposing one another on opposite sides of rotational axis 56 (i.e., the second reference line), and second and fourth groups are symmetrically positioned opposing one another on opposite sides of rotational axis 56. Thus, surfaces 46, 48, are subdivided into four distinct groups 68, 70, 72, 74 delineated by reference axis 76 and rotational axis 56.

It should be observed in FIG. 1 that groups 68, 70, 72, and 74 of adjacent pairs of surfaces 46, 48 are displaced away from reference axis 76. That is, surfaces 46, 48 are placed toward an outer edge 78 of movable body 34 to achieve higher sensitivity to Y-axis acceleration 26 (discussed below). Additionally, groups 68, 70, 72, and 74 of adjacent pairs of surfaces 46, 48 are spatially separated from fifth and sixth substrate surfaces 62, 64 to largely prevent interference between fifth and sixth substrate surfaces 62, 64, and surfaces 46, 48.

In an embodiment, compliant members 42 enable movement of movable body 34 in response to X-axis acceleration 22. In the exemplary embodiment, movable body 34 is adapted to undergo translational motion that is substantially parallel to face 36 of substrate 38 in response to X-axis acceleration 22. In connection with the illustrated embodiment, the translational motion of movable body 34 is leftward and rightward along X-axis 24 in the page upon which FIG. 1 is presented. The translational motion of movable body 34 in response to X-axis acceleration 22 is represented by a bi-directional straight arrow 80 in FIG. 1, and is referred to herein as translational motion 80.

Additionally, compliant members 42 enable movement of movable body 34 in response to Y-axis acceleration 26. In the exemplary embodiment, movable body 34 is adapted to undergo pivotal motion about a pivot axis that is substantially perpendicular to face 36 of substrate 38 in response to Y-axis acceleration 26. In connection with the illustrated embodiment, the pivotal motion of movable body 34 is about a pivot axis, which represented by a dark circle 82 in FIG. 1 and which is referred to herein as pivot axis 82. Pivot axis 82 extends perpendicular to the page upon which FIG. 1 is presented, and is thus aligned with Z-axis 30 (see FIG. 3). The pivotal motion of movable body 34 about pivot axis 82 in response to Y-axis acceleration 26 is represented by a bi-directional curved arrow 84 in FIG. 1, and is referred to herein as pivotal motion 84.

In some embodiments, such as in sensor device 20, compliant members 42 additionally enable movement of movable body 34 in response to Z-axis acceleration 30. In the exemplary embodiment, movable body 34 is further adapted to undergo pivotal motion about rotational axis 56 in response to Z-axis acceleration 30, where rotational axis 56 is substantially parallel to face 36 of substrate 38 and is aligned with Y-axis 28. The pivotal motion of movable body 34 about rotational axis 56 in response to Z-axis acceleration 30 is represented by a bi-directional curved arrow 86 in FIG. 3, and is referred to herein as pivotal motion 86.

To summarize, movable body 34 is adapted to undergo translational motion 80 that is parallel to face 36 of substrate 38 along X-axis 24 in response to X-axis acceleration 22. Movable body 34 is adapted to undergo pivotal motion 84 about pivot axis 82 that is perpendicular to face 36 of substrate 38 in response to Y-axis acceleration 26. And, movable body 34 further adapted to undergo pivotal motion 86 about rotational axis 56 that is oriented parallel to face 36 of substrate 38 in response to Z-axis acceleration 30. In alternative embodiments, however, a movable body may be a dual axes sensor adapted to undergo motion in response to X-axis acceleration 22 and Y-axis acceleration 26, without being adapted to undergo motion in response to Z-axis acceleration 30.

Figure 4:
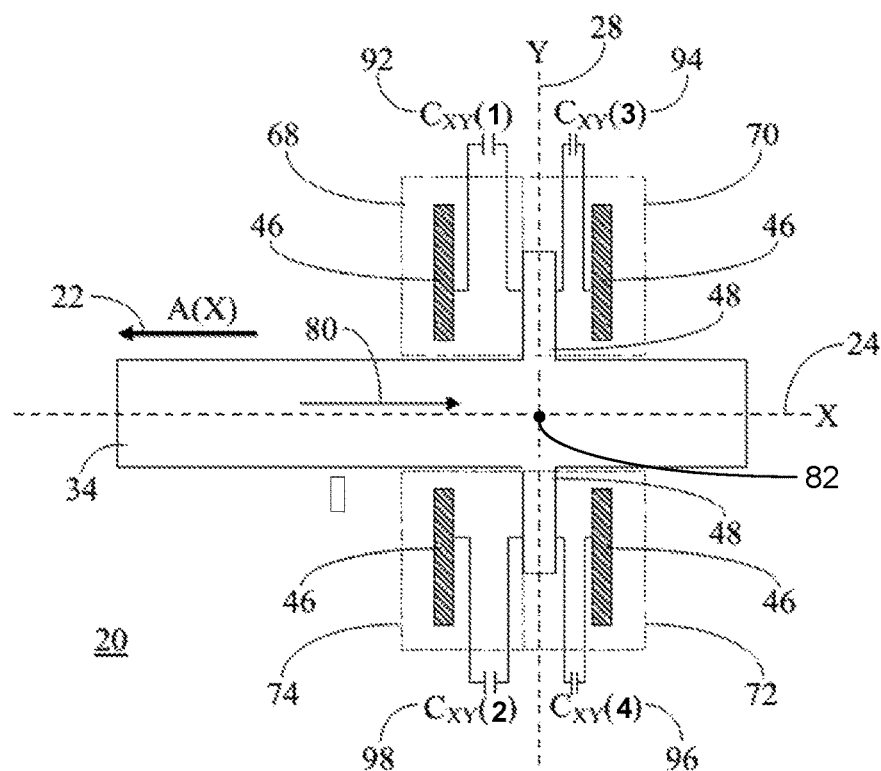
FIG. 4 schematically shows a simplified top view of an embodiment of a micro-electromechanical device subjected to a force.
Figure 5:
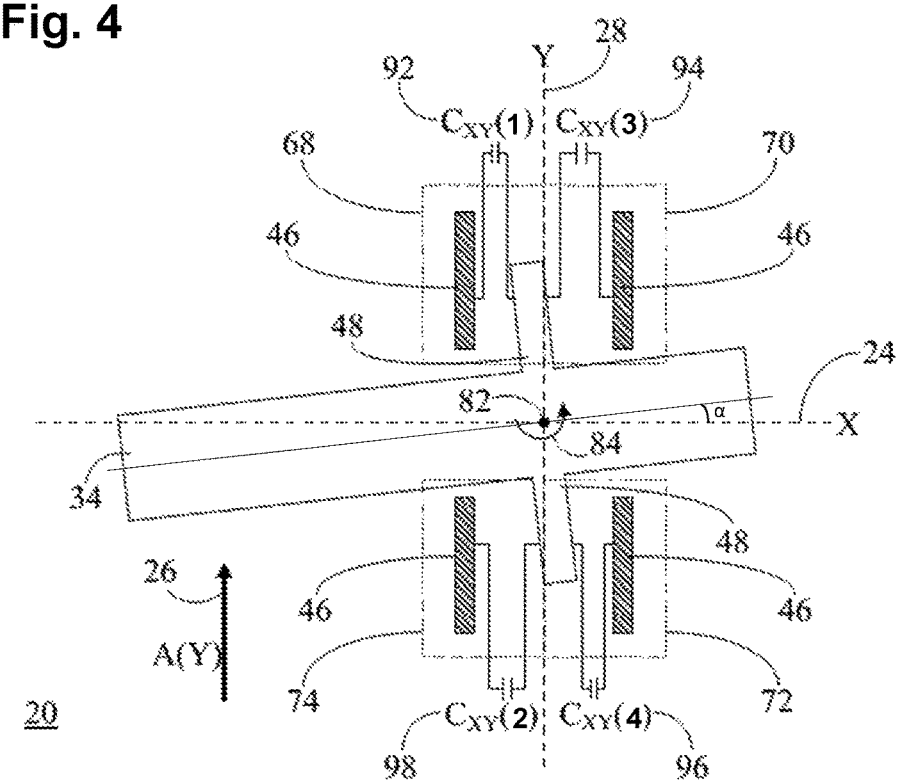
FIG. 5 schematically shows a simplified top view of the embodiment of the device of FIG. 4 subjected to another force.

FIGS. 4-5 (discussed below) are presented to demonstrate the application of differential logic to determine magnitude 106 of X-axis acceleration 22 and magnitude 108 of Y-axis acceleration 26 from capacitors 92, 94, 96, 98 in accordance with embodiments of the invention.

FIG. 4 schematically shows a simplified top view of an embodiment of a micro-electromechanical device 20 subjected to a force or acceleration stimulus 22, which causes movable body 34 to undergo translational motion 80 along X-axis 24. Translational motion 80 is opposite to the direction of X-axis acceleration 22. Accordingly, the arrow representing X-axis acceleration 22 is pointing leftward and the arrow representing translational motion 80 is pointing rightward in the illustrated embodiment.

In FIG. 4, groups 68, 70, 72, 74 are delineated by dotted line boxes. For simplicity, all of surfaces 46, 48 within first group 68 are represented by a single substrate surface 46 and a single movable body surface 48. Likewise, all of surfaces 46, 48 within third group 70 are represented by a single substrate surface 46 and a single movable body surface 48. All of surfaces 46, 48 within fourth group 72 are represented by a single substrate surface 46 and a single movable body surface 48. And, all of surfaces 46, 48 within second group 74 are represented by a single substrate surface 46 and a single movable body surface 48. As discussed previously, each of groups 68, 70, 72, and 74 can include any number of surfaces 46, 48 dictated by the design and a target sensitivity for MEMS accelerometer 20. Thus, substrate surfaces 46 in each of groups 68, 70, 72, and 74 may be suitably linked by conductive traces, or polyrunners, as known to those skilled in the art, to sum the individual capacitors within each group 68, 70, 72, and 74.

As shown in this illustration, when movable body 34 is subjected to X-axis acceleration 22, it undergoes translational motion 80 so that the distance between each of substrate surfaces 46 and their adjacent movable body surfaces 48 changes. It should be understood that translational motion 80 of movable body 34 shown schematically in FIG. 4 is exaggerated for illustrative purposes.

Due to the deflection of movable body 34, the capacitance changes between substrate and movable body surfaces 46, 48. This change in capacitance may be registered by a discrete or an integrated circuit such as an ASIC. As shown, the change in capacitance between surfaces 46, 48 of first group 68 is first capacitor 92. The change in capacitance between surfaces 46, 48 of third group 70 is third capacitor 94. The change in capacitance between surfaces 46, 48 of fourth group 72 is fourth capacitor 96. And, the change in capacitance between surfaces 46, 48 of second group 74 is second capacitor 98.

In order to evaluate and determine magnitude 106 of X-axis acceleration 22, an ASIC may apply the following formula for differential sensing:

$$A(X) \cong [C_{XY}(3) + C_{XY}(4)] - [C_{XY}(1) + C_{XY}(2)] \quad (1)$$

Thus, magnitude 106 of X-axis acceleration 22 is proportional to a summation of capacitances 94, 96 of third and fourth groups 70, 72 of surfaces 46, 48 subtracted by a summation of capacitances 92, 98 of first and second groups 68, 74 of surfaces 46, 48.

FIG. 5 schematically shows a simplified top view of the embodiment of the device 20 of FIG. 4 subjected to Y-axis force or acceleration stimulus 26, which causes movable body 34 to undergo pivotal motion 84 of movable body 34 about pivot axis 82. Pivotal motion 84 of movable body 34 opposes the direction of Y-axis acceleration stimulus 26. Accordingly, the arrow representing Y-axis acceleration stimulus 26 is pointing upwardly and the curved arrow representing pivotal motion 84 is directed counterclockwise. The angle of rotation is shown as α. Again, groups 68, 70, 72, 74 are delineated by dotted line boxes and the total quantity of surfaces 46, 48 in each of groups 68, 70, 72, 74 is represented by a single substrate surface 46 and a single movable body surface 48 for simplicity of illustration.

As shown in this illustration, when movable body 34 is subjected to Y-axis acceleration 26, it undergoes pivotal motion 84 about pivot axis 82, due at least in part to the greater mass of section 58 relative to section 60 of movable body 34. The differing mass of section 58 relative to section 60 causes an imbalance so that movable body 34 pivots about pivot axis 82. It should be understood that pivotal motion 84 of movable body 34 shown schematically in FIG. 5 is greatly exaggerated for illustrative purposes.

Pivotal motion 84 also changes the distance between each of substrate surfaces 46 and their adjacent movable body surfaces 48 changes. Consequently, capacitances 92, 94, 96, 98 change between substrate and movable body surfaces 46, 48 of respective groups 68, 70, 72, 74 and may be registered by an ASIC. In order to evaluate and determine magnitude 108 of Y-axis acceleration 26, an ASIC may apply the following formula for differential sensing:

$$A(Y) \cong [C_{XY}(1) + C_{XY}(4)] - [C_{XY}(2) + C_{XY}(3)] \quad (2)$$

Thus, magnitude 108 of Y-axis acceleration 26 is proportional to a summation of capacitances 92, 96 of first and fourth groups 68, 72 of surfaces 46, 48 subtracted by a summation of capacitances 94, 98 of second and third groups 70, 74 of surfaces 46, 48.

Although translational motion 80 is shown schematically in FIG. 4 and pivotal motion 84 is shown schematically in FIG. 5, is should be understood that the motion of movable body at a given instant may be a combination of translational motion 80 and pivotal motion 84. Capacitors 92, 94, 96, and 98 are thus used to determine both X-axis acceleration 22 and Y-axis acceleration 26 at that instant. For example, when there is X-axis acceleration 22 and no Y-axis acceleration 26, magnitude 106 determined via formula (1) scales with X-axis acceleration 22 and magnitude 108 determined via formula (2) is zero. When there is Y-axis acceleration 26 and no X-axis acceleration 22, magnitude 108 determined via formula (2) scales with Y-axis acceleration 26, and magnitude 106 determined via formula (1) is zero. When there is both X-axis acceleration 22 and Y-axis acceleration 26, each of magnitude 106 determined via formula (1) and magnitude 108 determined via formula (2) scale with X-axis acceleration 22 and Y-axis acceleration 26, respectively.

Figure 6:
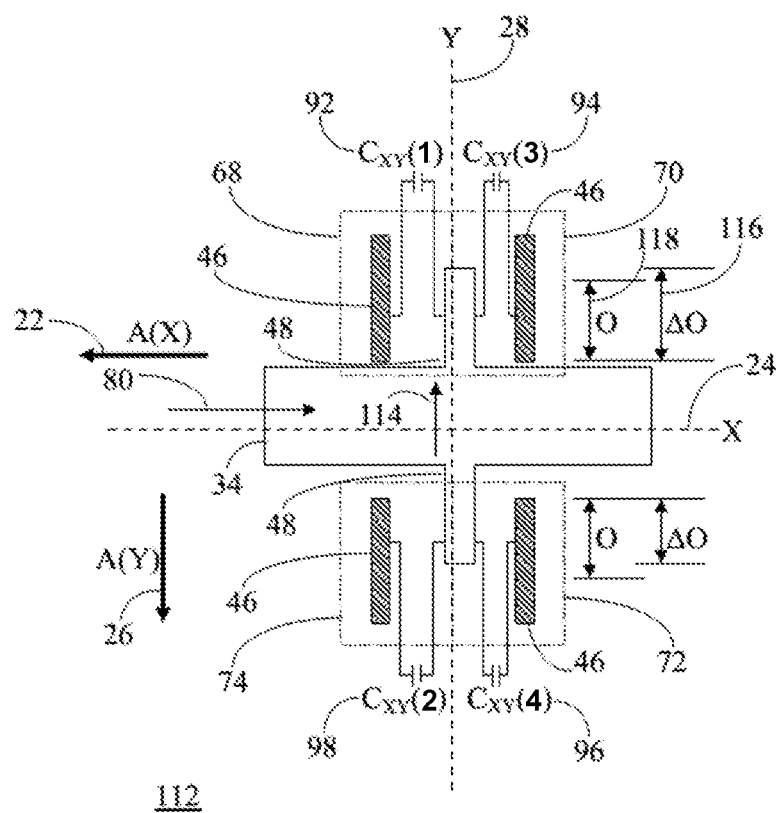
FIG. 6 schematically shows a simplified top view of an embodiment of a micro-electromechanical device being subjected to an acceleration stimulus.

FIG. 6 schematically shows a simplified top view of a MEMS sensor 112 being subjected to an acceleration stimulus in accordance with another embodiment. In particular, MEMS sensor device 112 is being subjected to Y-axis acceleration stimulus 26. For illustrative purposes, MEMS sensor device 112 is concurrently being subjected to X-axis acceleration stimulus 22. In this example, however, MEMS sensor device 112 includes compliant members (not shown) which cause movable body 34 to undergo translational motion 114 along Y-axis 28, as well as translational motion 80 along X-axis 24. Again, groups 68, 70, 72, 74 are delineated by dotted line boxes and the total quantity of surfaces 46, 48 in each of groups 68, 70, 72, 74 is represented by a single substrate surface 46 and a single movable body surface 48 for simplicity of illustration.

As shown in this illustration, when movable body 34 is subjected to X-axis acceleration 22, it undergoes translational motion 80, which can be determined in accordance with formula (1). As further illustrated, when movable body 34 is subjected to Y-axis acceleration 26, it undergoes translational motion 114, rather than pivotal motion 84 illustrated schematically in FIG. 5. Again, capacitances 92, 94, 96, 98 change between substrate surfaces 46 and movable body surfaces 48 of respective groups 68, 70, 72, 74 and may be registered by an ASIC. In order to evaluate and determine magnitude 108 of Y-axis acceleration 26, an ASIC may apply the following formula for differential sensing:

$$A(Y) \cong [C_{XY}(1) + C_{XY}(3)] - [C_{XY}(2) + C_{XY}(4)] \quad (3)$$

Thus, magnitude 108 of Y-axis acceleration 26 in this example is proportional to a summation of capacitances 92, 94 of first and third groups 68, 70 of surfaces 46, 48 subtracted by a summation of capacitances 96, 98 of second and fourth groups 72, 74 of surfaces 46, 48. This change in capacitances 92, 94, 96, 98 relies on a change of overlap area 116 of surfaces 46, 48 relative to a nominal overlap area 118.

Regardless of the particular structural configuration for detecting Y-axis acceleration 26 as demonstrated schematically in FIGS. 5 and 6, per convention, when movable body 34 is subjected to Z-axis acceleration 30, it undergoes pivotal motion 86 about rotational axis 56, due at least in part to the greater mass of section 58 relative to section 60 of movable body 34. Referring briefly back to FIG. 3, the differing mass of section 58 relative to section 60 causes an imbalance so that movable body 34 pivots about rotational axis 56. Pivotal motion 86 changes the distance between movable body 34 and the underlying fifth substrate surfaces 62. Consequently, capacitors sensing a motion in the Z direction may change and may be registered by an ASIC. As known to those skilled in the art, in order to evaluate and determine magnitude 110 of Z-axis acceleration 30, an ASIC may apply the following formula for differential sensing:

$$A(Z) \cong C_Z(1) - C_Z(2) \quad (4)$$

It should be appreciated that embodiments of the invention entail a compact MEMS sensor, for example, an accelerometer, that is capable of sensing a force, e.g., a net force such as acceleration, along two or more axes. Further embodiments entail a method of multiple axes sensing using the MEMS sensor device. The MEMS sensor device is adapted to detect forces in two perpendicular axes that are parallel to a face of the substrate. In particular, all substrate surfaces or all movable body surfaces are utilized to detect, for example, acceleration along both of the two perpendicular axes (e.g., X-axis and Y-axis) and differential logic is implemented for evaluating the acceleration. In some configurations, the MEMS sensor device may be further adapted to detect acceleration along an axis that is perpendicular to the face of the sensor (e.g., the Z-axis). A compact design with high sensitivity can be achieved by combining surfaces to sense the forces along the two perpendicular axes that are parallel to a face of the substrate.

An embodiment provides a MEMS sensor device that includes a movable body spaced apart from a surface of a substrate, the movable body including movable body surfaces. The movable body is adapted to undergo first motion in response to a first force and second motion in response to a second force, wherein the first and second forces are mutually perpendicular, and the first and second forces are substantially parallel to a face of the substrate. The MEMS sensor device further includes substrate surfaces attached to the substrate, the substrate surfaces being immovable relative to the surface of the substrate, wherein the substrate surfaces are oriented substantially parallel to one another and are arranged adjacent to the movable body surfaces, and wherein the substrate surfaces are immovable relative to the surface and the face of the substrate. The substrate surfaces or movable body surfaces are adapted to detect the first and second motion of the movable body by detecting the capacitance change.

Figure 7:
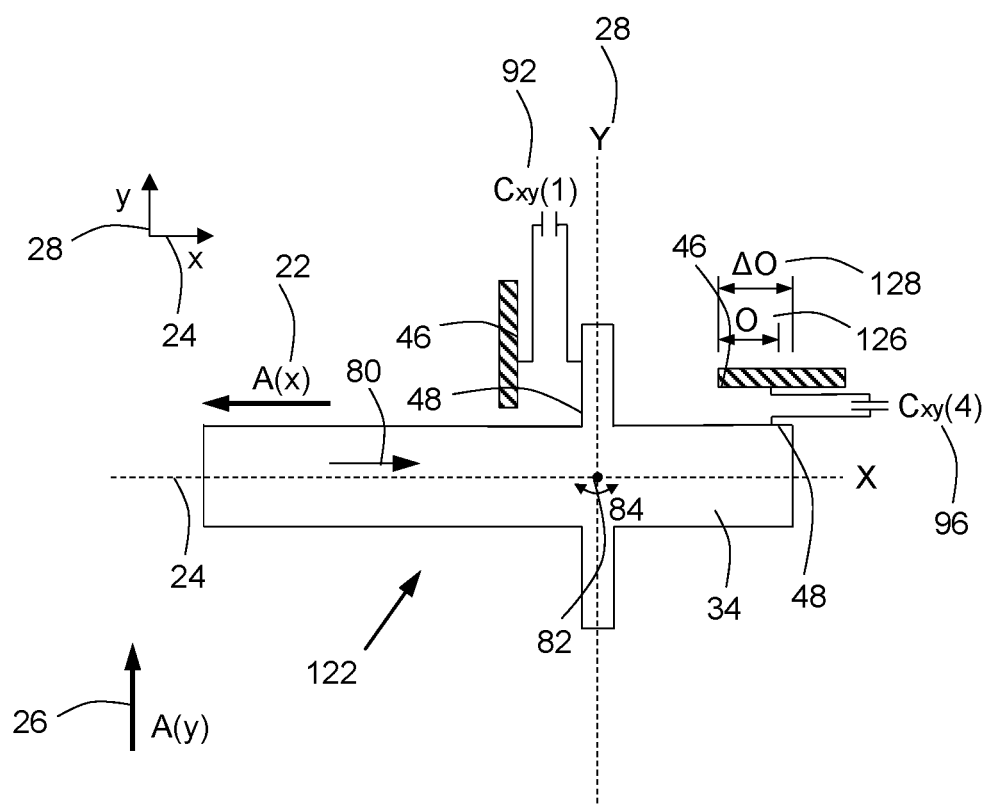
FIG. 7 schematically shows a simplified top view of a further embodiment of a micro-electromechanical device.

FIG. 7 schematically shows a simplified top view of a further embodiment of a MEMS sensor device 122. The sensor device includes substrate surfaces 46 and a movable body 34. The movable body includes movable body surfaces 48. The substrate surfaces and the movable body surfaces are arranged adjacently in pairs to form a first capacitor 92 and a fourth capacitor 96.

The movable body undergoes a first motion 80 along an X-axis 24 in response to a first force 22 along the X-axis. The movable body undergoes a second pivotal motion 84 around a pivot axis 82 in response to a second force 24 along a Y-axis 28. Both capacitors change due to the first and second motions.

In order to evaluate and determine magnitude 106 of X-axis acceleration 22, an ASIC may apply the following formula for differential sensing:

$$A(X) \cong C_{XY}(4) - C_{XY}(1) \quad (5)$$

Thus, magnitude 106 of an X-axis acceleration 22 is proportional to capacitance 96 subtracted by a capacitance 92.

In order to evaluate and determine magnitude 108 of Y-axis acceleration 26, an ASIC may apply the following formula for differential sensing:

$$A(Y) \cong C_{XY}(4) + C_{XY}(1) \quad (6)$$

Thus, magnitude 108 of Y-axis acceleration 26 is proportional to capacitance 96 added to a capacitance 92. This change in capacitances 92 and 96 relies on a change of overlap area 126 of surfaces 46, 48 relative to a nominal overlap area 128. According to one embodiment, a micro-electro-mechanical acceleration sensor device is disclosed. In an embodiment, the micro-electro-mechanical acceleration sensor device includes a substrate having a first substrate surface and a substrate plane. The micro-electro-mechanical acceleration sensor device also includes a movable body having a first movable body surface. In an embodiment, the first substrate surface and the first movable body surface may constitute a first capacitor having a first capacitance. In an embodiment, the movable body may undergo a first displacement relative to the substrate plane in response to a first acceleration, and the first displacement may change the first capacitance. The an embodiment, the first displacement is parallel to the substrate plane. In an embodiment, the first displacement has a first angle relative to the first substrate surface and is parallel to the substrate plane. In an embodiment, the first angle is oblique to the first substrate surface. In an embodiment, the first capacitor may yield a maximum change of the first capacitance in response to the first displacement.

Figure 8:
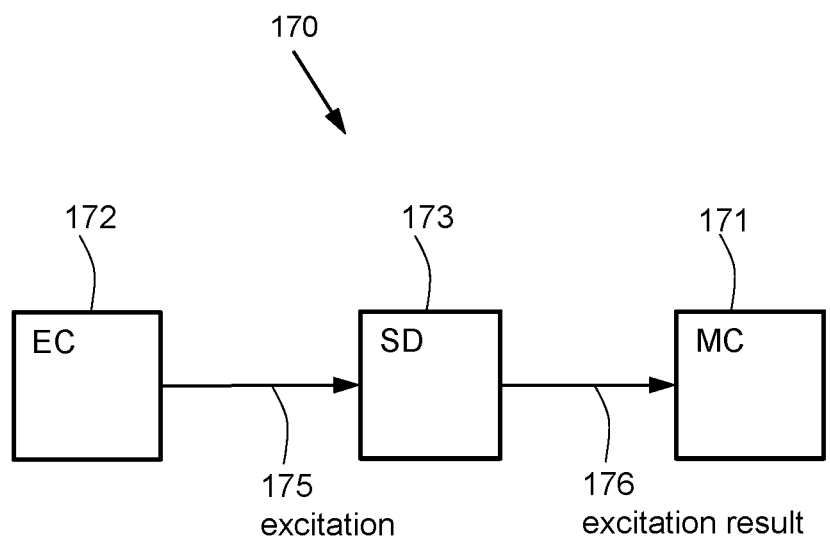
FIG. 8 schematically shows a block diagram of an embodiment of a system including an embodiment of a micro-electromechanical device.

FIG. 8 schematically shows a block diagram of an embodiment of a system 170 including an embodiment of a micro-electromechanical device 173, an excitation circuit suitable 172 to excite the sensor device and a measuring circuit 171 for measuring results from the excitation. The excitation circuit and the sensor device are electrically coupled 176 to convey the excitation from the excitation circuit to the sensor device. The sensor device and the measuring circuit are electrically coupled 175 to convey the excitation results from the sensor device to the measuring circuit.

A micro-electromechanical system including a first MEMS device as described above, a first excitation circuit for a first electrical excitation of at least one surface of the first capacitor of the first MEMS device; and a first measuring circuit for measuring a first electrical result of said first excitation on another surface of the first capacitor of the first MEMS device.

A system may further include a second MEMS device as described above, wherein the first displacement of the first MEMS device is independent from the first displacement of the second MEMS device.

A system may further include a second MEMS device as described above, wherein the first displacement of the first MEMS device is independent and different from the first displacement of the second MEMS device.

Figure 9:
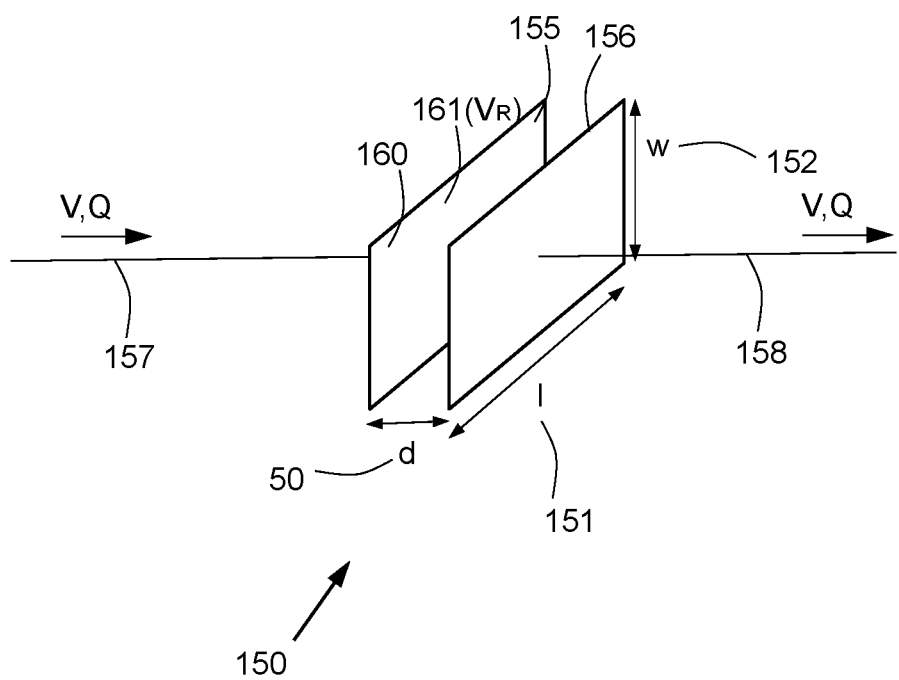
FIG. 9 schematically shows a parallel-plate capacitor.

FIG. 9 schematically shows a parallel-plate capacitor 150 including a first plate 155 and a second plate 156 placed adjacent and parallel to each other providing a capacitor gap 50. The first plate is electrically accessible through a first electric wire 157. The second plate is electrically accessible through a second electric wire 158.

A generic capacitor allows a voltage to be placed across the two sides of a capacitor. The voltage placed across the capacitor causes a charge displacement. The charge displacement is depending on the voltage and capacitance of the capacitor according to the following formula:

$$Q = C*V \quad (7)$$

A capacitance of a parallel-plate capacitor according to FIG. 9 is defined by the following formula:

Defining:

C=capacitance in F $\varepsilon_r$=relative static permittivity or dielectric constant $$\varepsilon_0 = \text{electric constant} \cong 8.854*10^{-12} \text{in} \frac{F}{m}$$

A=area of overlap
d=distance between plates
l=length of plate
w=width of plate
Then:

$$C = \varepsilon_r \varepsilon_0 \frac{A}{d} = \varepsilon_r \varepsilon_0 \frac{l*w}{d} \quad (8)$$

The parallel-plate capacitor may be used as a first approximation for the capacitors in this document. It is clear for the reader that from the parallel-plate capacitor the capacitance may be changed in three distinct ways.

A first way is to change an amount of overlap A between the plates. An increase in the overlap will increase the capacitance; a decrease in the overlap will decrease the capacitance.

A second way is to change a distance d between the plates. An increase in the distance will decrease the capacitance; a decrease in the distance will increase the capacitance.

A third way is to change the dielectric constant $\varepsilon_r$. The parallel-plate capacitor defines a rectangular volume with boundaries set by the parts of the plates providing the overlap 161. The dielectric constant is determined by the material in the rectangular volume. The dielectric constant may be changed by changing the material in the rectangular volume. A change may be done by interchanging a first material in the rectangular volume with a second material in the rectangular volume. An example of one of the materials may be air. Another way to change the dielectric constant is to change the orientation of the material in the rectangular volume when the dielectric constant of the material is orientation dependent.

Figure 10:
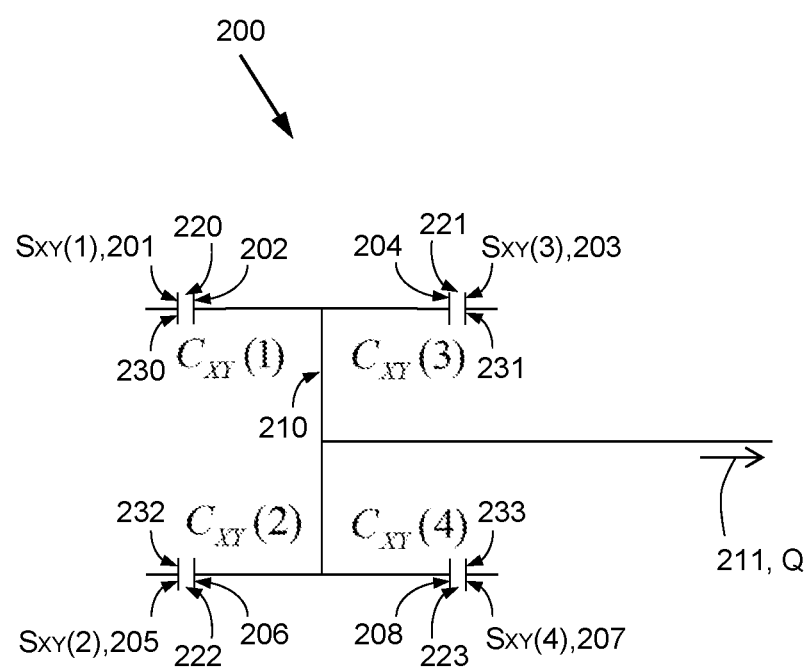
FIG. 10 schematically shows an equivalent circuit diagram of an embodiment of a sensor device.

The embodiment of FIG. 1 is schematically presented in FIGS. 4 and 5. The FIGS. 4 and 5 schematically show the mechanical displacement of the movable body relative to the substrate face. Furthermore the FIGS. 4 and 5 schematically show capacitors between movable body surfaces and the substrate surfaces. FIG. 10 schematically shows an equivalent circuit diagram of an embodiment of a sensor device 200 according to the FIGS. 4 and 5. The device has four capacitors Cxy(1) 220, Cxy(3) 221, Cxy(2) 222 and Cxy(4) 223. Each capacitor 220, 221, 222, 223 includes a first plate formed by a substrate surface Sxy(1), 201; Sxy(3), 203; Sxy(2), 205; Sxy(4), 207 and a second plate formed by a movable body surface 202, 204, 206, 208 having a capacitance between these plates.

The movable body 34 is represented by an electrical wire interconnect 210 electrically connecting the movable body surfaces for superposition or directly adding the charge displacements 211, Q produced by the four capacitors. The capacitances of the capacitors may change according to displacement of the movable body. Examples of displacements of the movable body are shown schematically in the FIGS. 4 and 5.

The displacement of the movable body changes a gap 230, 231, 232, 233 between the first and the second plate of the capacitors thereby changing the capacitance of the capacitors. By selecting appropriate voltages for the placing in the first method mentioned above charge displacements for the X axis or Y axis can be directly combined for measuring respectively an X axis or a Y axis displacement.

As an example a displacement of the movable body as shown schematically in FIG. 4 causes the capacitances of Cxy(1) and Cxy(2) to decrease and the capacitances of Cxy(3) and Cxy(4) to increase.

As a second example a displacement of the movable body as shown schematically in FIG. 5 causes the capacitances of Cxy(2) and Cxy(3) to decrease and the capacitances of Cxy(1) and Cxy(4) to increase.

Although the schematic representation in FIG. 5 shows that the displacement of the movable body not only changes the gap of the capacitors, the displacement also shows the loss of uniformity of the gap size over the overlapping area of the surface sides making up the capacitor. In an embodiment of the device this loss of uniformity is a secondary effect. As an example the embodiment of the sensor device in FIG. 1 has the surfaces placed at considerable distance from the pivot axis 82 in relation to the length arrangement 49 thereby minimizing the loss of uniformity effect. As a second argument the rotational displacement is small. The skilled person is known with the rule of l'Hôpital wherein $\sin(x)/x$ approximates 1 for small x, wherein x represents the displacement, wherein $\sin x$ is the displacement of a distal point of the substrate surface in reference to the pivot axis and x is the displacement of the substrate surface due to a translation. Hence the rotational displacement of the movable body may be approximated by a translation wherein the loss of uniformity of the gap may be neglected.

Figure 11:
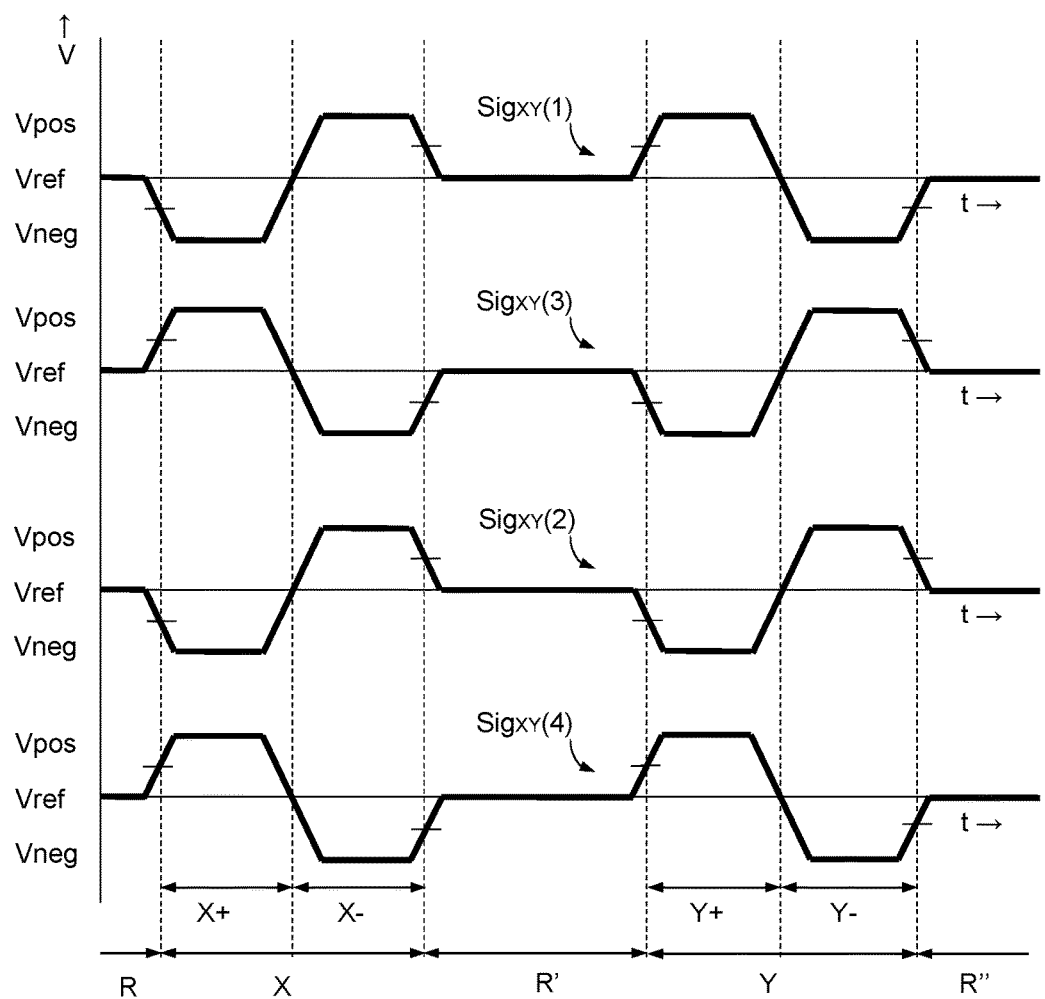
FIG. 11 schematically shows a signal addressing scheme.

FIG. 11 schematically shows a signal addressing scheme for the sensor device according to FIGS. 1, 2, 3, 4, 5 and 7. The signals of FIG. 11 may be generated by an excitation circuit of FIG. 8. The vertical axis shows the voltages for the four substrate surfaces of the sensor device. The horizontal axis shows the progression of time. For each substrate surface three voltages are defined. A positive voltage, a negative voltage and a reference voltage. In an embodiment the positive and negative voltages are placed on opposite sides of the reference voltage. In an embodiment the positive and negative voltages are placed on opposite sides of and at the same distance from the reference voltage. In an embodiment a positive voltage may be at 1.6V, a negative voltage may be at 0V and a reference voltage may be at 0.8V. The reference voltage is the voltage the system is stably and no measurement is performed.

FIG. 11 schematically shows several reference periods R, R', R" where no excitation signal is applied to the sensor device. The period indicated with X is for measuring acceleration along the X-axis, the period indicated with Y is for measuring along the Y-axis. The X period is subdivided in a period X+ measuring the acceleration in the positive direction of the X-axis and a period X− measuring the acceleration in the negative direction of the X-axis. The Y period is subdivided in a period Y+ measuring the acceleration in the positive direction of the Y-axis and a period Y− measuring the acceleration in the negative direction of the Y-axis.

The signal addressing scheme of FIG. 11 may also be used for the sensor device according to FIG. 6 with the change that the inverse signals are applied for Sigxy(3) and Sigxy(4) during the Y period.

Measuring the acceleration along the positive and negative direction of an axis provides two measurements wherein ideally the first measurement is a negation of the second measurement. This type of measurement may be used for compensation of errors, such as errors in the excitation circuit, sensor device or measurement circuit.

The first combination of excitations of the substrate surfaces provide a charge displacement related to a displacement of the movable body along a positive direction of an X axis. The second combination of excitations of the substrate surfaces provides a charge displacement related to a displacement of the movable body along a negative direction of the X axis. The third combination of excitations of the substrate surfaces provide a charge displacement related to a displacement of the movable body along a positive direction of a Y axis. The fourth combination of excitations of the substrate surfaces provides a charge displacement related to a displacement of the movable body along a negative direction of the Y axis.

According to one embodiment, a method for measuring acceleration using a system that includes a sensor device is disclosed. The method includes selecting a first excitation surface from the group of a substrate surface and a first movable body surface, thereby defining the other surface as a first sensing surface. In an embodiment, the sensor device includes a substrate having the first substrate surface and a movable body having the first movable body surface. The method also includes placing the first excitation surface at a reference voltage; exciting the first excitation surface with a first excitation voltage. The method further includes measuring a first charge change from the first sensing surface from said placing to said exciting for measuring a first acceleration. In an embodiment, the first substrate surface and the first movable body surface may constitute a first capacitor having a first capacitance. In an embodiment, the substrate further has a substrate plane. In an embodiment, the movable body may undergo a first displacement relative to the substrate plane, in response to a first acceleration, the first displacement changing the first capacitance. In an embodiment, the first displacement has a first angle relative to the first substrate surface parallel to the substrate plane. In an embodiment, the first angle is oblique to the first substrate surface. In an embodiment, the first displacement yields a maximum change of the first capacitance.

Figure 12:
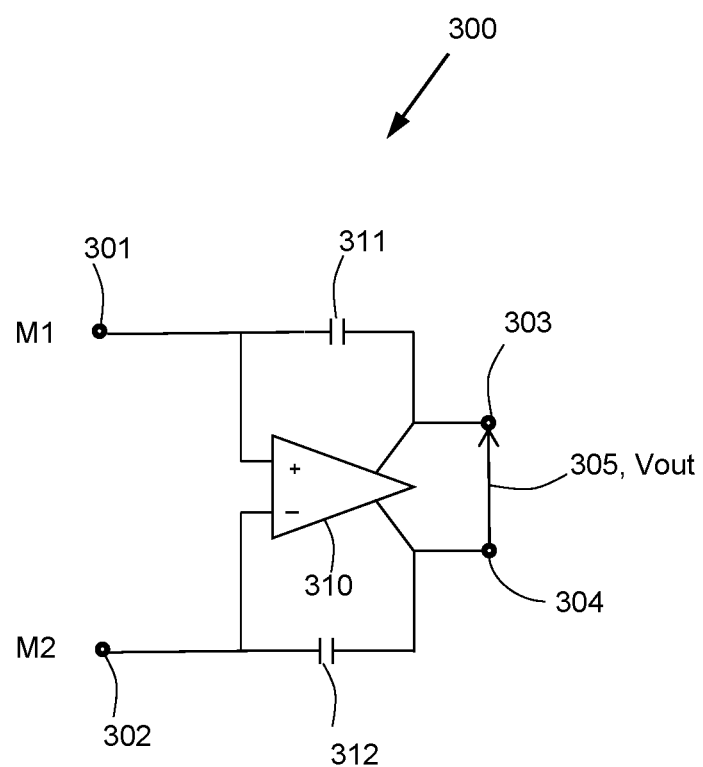
FIG. 12 schematically shows a schematic embodiment of a measurement circuit of a micro-electromechanical system.

FIG. 12 schematically shows a schematic embodiment of a measurement circuit 300 of a micro-electromechanical system. The measurement circuit of FIG. 12 may be the measurement circuit shown schematically in FIG. 8. The measurement circuit has a positive input 301 and a negative input 302 for differential input to the measurement circuit. The positive input may be connected to a first movable body 34 of a first sensor device. The second input may be connected to a second movable body 34 of a second sensor device. The second sensor device is configured to have a charge displacement which is an inverted charge displacement compared to the first movable body thereby providing the differential input. The inverted input may be supplied by inverting the wiring of the sensor device or the excitation voltages of the sensor device or a combination hereof.

The measurement circuit further includes a positive output 303 and a negative output 304 providing a differential voltage 305, Vout representing the differential charge displacement of the input connections.

The measurement circuit further includes an operational amplifier 310, a first reference capacitor 311 and a second reference capacitor 312. The positive input of the operational amplifier is connected to the positive input. The negative input of the operational amplifier is connected to the negative input. The positive output of the operational amplifier is connected to the positive output. The negative output of the operational amplifier is connected to the negative output. The first reference capacitor is placed over the positive input and the positive output of the operational amplifier. The second reference capacitor is placed over the negative input and the negative output of the operational amplifier.

A charge displacement of the first sensor device causes a first voltage across the first reference capacitor. A charge displacement of the second sensor device causes a second voltage across the second reference capacitor, which is the inverse voltage from the first voltage. The operational amplifier amplifies the voltage difference at the input and places the amplified voltage difference of the input at the output. If the amplification of the operational amplifier is as an approximation idealized to be infinite, the input voltage difference will be zero and the output voltage will be the subtraction of the voltages across the reference capacitors.

The measurement circuit of FIG. 12 may comply with the following formula when connected as described above:

Defining:

$n \in \{1,2\}; m \in \{a,b\}$ $\Delta C = \Delta C_{nm}$ for $\forall n \wedge \forall m$; sensor device capacitor change in F $C_{ref}$=reference capacitor in F
$V_{ex}$=excitation voltage in V
$V_{out}$=output voltage in V
Then:

$$V_{out} = 8 * \frac{\Delta C * V_{ex}}{C_{ref}} \tag{9}$$

A compact design with high sensitivity, as shown in formula 9, can be achieved by combining surfaces to sense the forces preferably along two perpendicular axes that are parallel to a face 36 of the substrate 38, which is preferably a substantially planar surface, which is more preferably a planar surface. Formula 9 shows a multiplication factor of eight, where the prior art shows a multiplication factor of four, hence a possible increase of sensitivity by a factor of two.

In an embodiment the MEMS sensor complies with the following formula:
Defining:
k=spring constant in N/m
c=centre of gravity in meters (x, y)
b=attachment point in meters (x, y)
n=amount of attachment points
p=variable indicating an attachment point
m=massa in kg
$M_p$=momentum of torque for p
$\lambda$=asymmetry
Then:

$$\vec{M}_p = (c - b_p)k \tag{10}$$

$$\frac{\left\|\sum_{p=1}^{n} \vec{M}_p\right\|}{\sum_{p=1}^{n} \left\|\vec{M}_p\right\|} \geq \lambda \tag{11}$$

The term $\sum_{p=1}^{n} \|\vec{M}_p\|$ normalizes the value of $\sum_{p=1}^{n} \vec{M}_p$. The embodiment of FIG. 6 has a $\lambda$, which approaches 0, thereby preventing the mass m from rotating when a force transverse to the vector $\sum_{p=1}^{n} \vec{M}_p$ is applied to the mass. The embodiment of FIG. 6 is aimed at preventing a rotation of the mass. A MEMS sensor according to the FIGS. 1-5, and 7 have a $\lambda$ significantly higher than 0.

Figure 13:
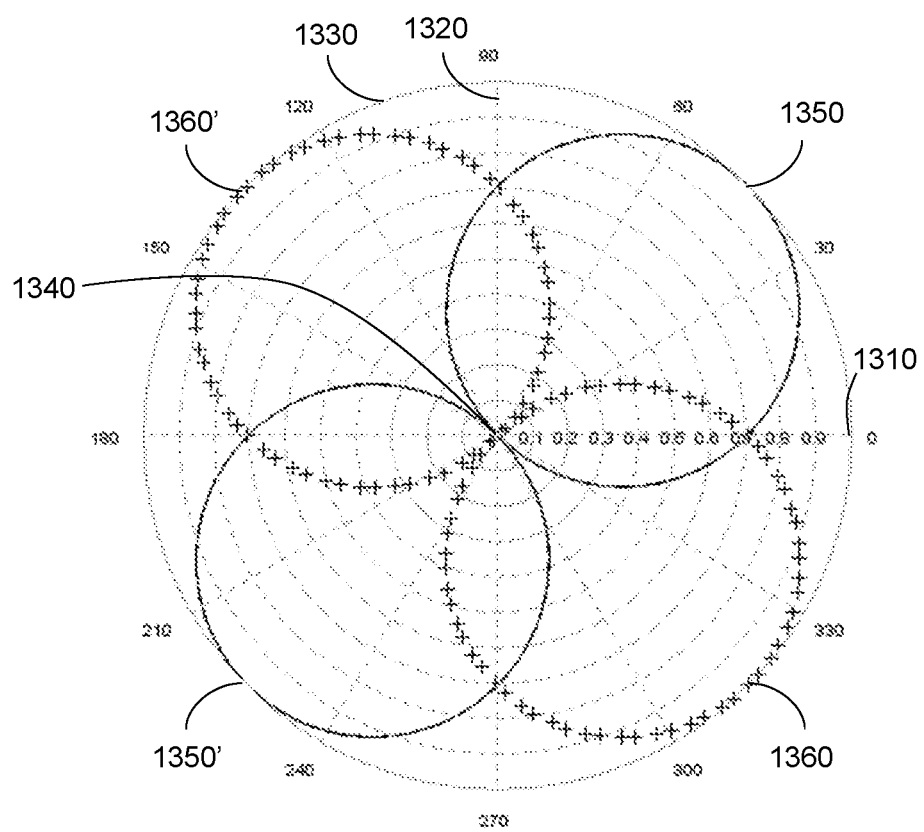
FIG. 13 schematically shows a sensitivity of an embodiment of a sensor device.

FIG. 13 schematically shows a sensitivity to an acceleration in a particular direction of an embodiment of a sensor device with at least two capacitors having each a capacitance. The capacitors include each a substrate surface and a movable body surface. At least one of the two substrate surfaces, preferable both, is either placed parallel to an axis of 0 degrees, which is represented by the line 1310, or an axis of 90 degrees, which is represented by the line 1320. The maximum sensitivity is normalized to the unity circle, which is represented by the line 1330. The minimum sensitivity is at the origin, which is represented by the point 1340 of the axes.

The acceleration is parallel to a substrate plane and has an acceleration amplitude and direction. The sensitivity is expressed in an amplitude varying between 0 and 1. A sensitivity of 0 means that an acceleration in that direction does not cause a change in capacitance. A sensitivity of 1 means that an acceleration in that direction does cause a maximum change in capacitance. The sensitivity of the first capacitor is shown as a solid line. The sensitivity of the second capacitor is shown as a string of plus signs. The angle varies from 0 degrees to 360 degrees.

It is shown in FIG. 13 that the maximum sensitivity of the first capacitor, as represented by circles 1350 and 1350', and second capacitor as represented by circles 1360 and 1360', are oblique to at least one substrate surface. Further is shown that the maximum sensitivity of the first capacitor is in a different direction compared to the maximum sensitivity of the second capacitor. In a preferred embodiment of the sensor device the directions of the maximum sensitivity of the capacitors are orthogonal. In a further preferred embodiment the directions of the maximum sensitivity of the capacitors are placed under an angle of approximately 45 degrees to the axes.

It is shown in FIG. 13 that the minimum sensitivity of the first and second capacitor are oblique to at least one substrate surface. Further is shown that the minimum sensitivity of the first capacitor is in a different direction compared to the minimum sensitivity of the second capacitor. In a preferred embodiment of the sensor device the directions of the minimum sensitivity of the capacitors are orthogonal. In a further preferred embodiment the directions of the minimum sensitivity of the capacitors are placed under an angle of approximately 45 degrees.

In a preferred embodiment of the sensor device the minimum sensitivity of one capacitor matches the maximum sensitivity of the other capacitor. In the context of this document an extreme of a curve means either a maximum or a minimum in a curve. An example of a curve is a polar plot of a sensitivity of a change of a capacitance of a capacitor due to an acceleration in a particular direction.

The polar plot of FIG. 13 does not show the sign of a capacitance change. A change of capacitance can either be positive or negative, the polar plot shows the absolute value of the capacitance change. Taking into account the sign of the capacitance change an arrangement of two capacitors according to the description of FIG. 13 may be used to detect a size and direction of an acceleration in the plane of the polar plot, which is a plane parallel to the substrate plane.

An arrangement with only one capacitor having a capacitance with a maximum sensitivity oblique to a substrate surface is another example of a sensor device measuring acceleration. The above description of FIG. 13 is valid for this arrangement as far as that one capacitor does not allow to determine a direction and amplitude of the acceleration. If one, either direction or amplitude, is known and the acceleration is not in a direction of a minimum sensitivity the acceleration can be deduced from the capacitance change of the one capacitor.

The embodiment of the sensor device of FIG. 13 may be extended with an additional capacitor having a sensitivity with equal extremes, but wherein the capacitance change has an opposite sign allowing for compensation of the measurement of the acceleration.

The embodiment of the sensor device of FIG. 13 may be extended with an additional capacitor having a sensitivity wherein the maximum sensitivity of the additional capacitor in a predetermined direction is unequal to a direction of a maximum sensitivity of other capacitors allowing for a higher sensitivity to accelerations over the complete range of angles.

The two above mentioned extensions may be combined advantageously possible.

Known are capacitors wherein all extremes of the sensitivity is placed on an axis of 0 or 90 degrees.

The figures above of different embodiments of a MEMS sensor including a movable body, wherein the movable body includes a movable body surface 48. In a further embodiment the movable body is at least partly conductive to electrically couple one or more of the multiple movable body surfaces.

In an embodiment the movable body is used as sensing side of the capacitor electrically aggregating the movable body surfaces to advantageously reduce the amount of electrical couplings between the movable body and the substrate. In an example of this embodiment the movable body is resiliently connected with springs to the substrate, wherein the springs are at least partly conductive to advantageously combine a resilient part with a conductive part to provide the electrical coupling and to prevent additional wiring between movable body and substrate.

A vector in a plane representing a quantity and direction in this plane of a variable may be decomposed in two separate vectors along two axes placed in the plane, whereby these axes are different and preferably independent. Preferably the axes are perpendicular, more preferably these axes are orthonormal. Examples of variables are force, acceleration, displacement. The plane is preferably selected parallel to the substrate plane 36. The axes are preferably selected parallel or perpendicular to the substrate surfaces forming the capacitor.

A subset of embodiments of a sensor device may be defined by sensor devices having substantially parallel substrate surfaces or having at least two substrate surfaces which are substantially perpendicular. Moreover a subset of sensor devices may be defined by sensor devices having substantially oblique substrate surfaces.

In an alternative embodiment of the sensor device the movable body is used to place a voltage upon according to the first method described above. The substrate surfaces are combined in this embodiment to aggregate the charge displacements to measure the displacement of the movable body and thereby having a measurement of the acceleration acting upon the sensor device.

The first and second method of measurement described above may be applied to an embodiment of a MEMS sensor as described in this document.

The effect of the measures of the claims are that by combining capacitors in different ways the same capacitors may be used to sense acceleration or force along different and preferably independent axes. By combining capacitors in different ways the amount of capacitor area can be reduced while maintaining substantially the same sensitivity. Thus, the die size can be reduced, thereby reducing the cost price, while maintaining substantially the same sensitivity. Another effect may be to increase the sensitivity of the MEMS sensor device having the same size. Yet another effect may be to combine size reduction and sensitivity increase wherein size reduction and sensitivity are balanced.

Oblique in the context of this document should be understood as an angle which is not having a zero angle and not perpendicular to a reference axis. Oblique is preferable around 45 degrees or $\pi/4$ radians. An extreme in the context of this document should be understood as including a maximum or a minimum. Force and acceleration are interchangeable words for this document, unless otherwise specified. For a movable body having an asymmetry a displacement may be decomposed in a translational displacement and a rotational displacement both parallel to a substrate plane of a substrate of a sensor device.

In an embodiment, the first substrate surface may have a change of the first capacitance proportional to a first displacement. In a further embodiment, the second substrate surface may have a change of the second capacitance proportional to a second displacement. In an embodiment, the fifth substrate surface may have a change of the fifth capacitance proportional to a third displacement.

The sensor device may in an embodiment have a movable body and a substrate which are mechanically resiliently coupled with at least one spring, preferably more than one spring, more preferably four springs according to FIG. 1.

In an embodiment two or more of the capacitors of the sensor device have equal capacitances when no acceleration is acting upon the sensor device, wherein no acceleration is defined as no acceleration in reference to earth. Capacitors with equal capacitances have a capacitance relative to the other capacitance in a range of 0.5-2.0, preferable 0.75-1.33, more preferable 0.83-1.20, more preferable 0.91-1.10, more preferable 0.95-1.05, most preferable 0.98-1.02. This change among other influences is due to IC production variation.

Embodiments of the invention provide a method for determining a capacitance of a capacitor including a first and a second plate including keeping the first and the second plate of the capacitor at a first and a second voltage; placing the first plate of the capacitor at a different voltage relative to the first voltage; measuring a first amount of charge displaced by the second plate of the capacitor; and determining the capacitance by dividing the displaced charge by a result of the subtraction of the first voltage from the different voltage.

Embodiments of the invention provide a second method for determining a capacitance of a capacitor including a first and a second plate placing the first and the second plate of the capacitor at respectively a first and a second voltage defining a first voltage difference; supplying the first plate of the capacitor with a charge; measuring a second voltage difference over the plates; and determining the capacitance by dividing the displaced charge by a result of the subtraction of a the first difference voltage from the second difference voltage.

In a further embodiment are capacitance measurements of the first capacitance method according to a method of the claims combined by using a second placing wherein a second different voltage is applied, wherein the second different voltage is opposite from the first different voltage in reference to the first voltage followed by a second measuring, measuring a second amount of charge. This provides two measurements with an opposite charge displacement ideally. These second placing and second measuring allow for offset compensation. This offset may be, but is not limited to, a difference in capacitance of capacitors used, a difference in voltages applied or a directional dependency of the suspension of the movable body.

In a further embodiment are multiple capacitors combined to measure multiple capacitors or changes to capacitors in one measuring. It will be obvious to the skilled person that if two capacitors are combined, whereof the capacitances change in opposite direction, application for the first method during placing of opposite voltages allow superposition of the two charge displacements from both capacitors. This allows for amplification of the capacitance changes by direct addition of the charge displacements. A similar argument can be held for and how to combine the capacitances for the second capacitance measurement method.

In a further embodiment four capacitors changing due to an acceleration or a force acting upon the movable body are combined. The four capacitors should be configured to measure acceleration along distinct axes. The four capacitors should further be configured to combine the four capacitors in pairs, wherein the pairs are changed for different axes and wherein the pairs have an inverse the capacitance change. The effect of this configuration is that the combination of the pairs cancel out the capacitance in rest or not subjected to acceleration and leaves as a result the capacitance change due to the displacement of the movable body.

A method for measuring the capacitance or capacitance change of a MEMS sensor device may meet one or more of the following conditions:
  the first and second excitation voltages have an equal distance from the reference voltage;
  the second excitation voltage is equal to the first excitation voltages;
  the second and third excitation voltages have an equal distance from the reference voltage;
  the first and fourth excitation voltages have an equal distance from the reference voltage;
  the second and fifth excitation voltages have an equal distance from the reference voltage; or
  the second and sixth excitation voltages have an equal distance from the reference voltage.

While the principles of the inventive subject matter have been described above in connection with specific embodiments, it is to be clearly understood that the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Further, the phraseology or terminology employed herein is for the purpose of description and not of limitation.

The foregoing description of specific embodiments reveals the general nature of the inventive subject matter sufficiently so that others can, by applying current knowledge, readily modify or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

The invention claimed is:
1. A micro-electro-mechanical acceleration sensor device, the device comprising:
  a substrate having a substrate plane, a first substrate surface, and a second substrate surface, the first and second substrate surfaces being perpendicular to the substrate plane, and the first substrate surface being parallel to the second substrate surface;
one or more suspension anchors formed on the substrate; and
a movable body having a first movable body surface and a second movable body surface, the movable body being interconnected with the substrate via the one or more suspension anchors and compliant members, the movable body having a first reference axis that coincides with a first centerline of the movable body, the first movable body surface being parallel to the second movable body surface, the first movable body surface being on a side of the first reference axis opposite to the second movable body surface;
wherein the first substrate surface and the first movable body surface are configured to constitute a first capacitor having a first capacitance, and the second substrate surface and the second movable body surface are configured to constitute a second capacitor having a second capacitance;
wherein the movable body is configured to undergo a first displacement relative to the substrate plane in response to a first acceleration, the first acceleration being parallel to the first reference axis, the first displacement changing the first capacitance and the second capacitance with a common polarity, and wherein the movable body is configured to undergo a second displacement in response to a second acceleration that is perpendicular to the first reference axis and that is parallel to the first substrate surface, the second displacement changing the first capacitance and the second capacitance with opposite polarities, wherein the first displacement is a translation parallel to the first reference axis and the second displacement is a translation perpendicular to the first reference axis and parallel to the substrate plane.

2. The device according to claim 1,
wherein the substrate has a third substrate surface and a fourth substrate surface, the third and fourth substrate surfaces being parallel to the substrate plane;
wherein the movable body has a second reference axis that coincides with a second centerline of the movable body perpendicular to the first reference axis, the movable body has a third movable body surface and a fourth movable body surface, the third movable body surface being parallel to the fourth movable body surface, the third movable body surface being on a side of the second reference axis opposite to the fourth movable body surface;
wherein the third substrate surface and the third movable body surface are configured to constitute a third capacitor having a third capacitance, and the fourth substrate surface and the fourth movable body surface are configured to constitute a fourth capacitor having a fourth capacitance;
wherein the movable body is configured to undergo a third displacement relative to the substrate in response to a third acceleration, the third acceleration being perpendicular to the first and second accelerations, the third displacement changing the third capacitance and the fourth capacitance with opposite polarities.

3. The device according to claim 2, wherein, when the movable body is not subjected to the first and second accelerations, the first capacitance and the second capacitance are configured to be equal.

4. The device according to claim 3, wherein, when the movable body is not subjected to the third acceleration, the third capacitance and the fourth capacitance are configured to be equal.

5. The device according to claim 1, wherein the movable body surfaces are electrically coupled.

6. A method for measuring acceleration using a system comprising a sensor device, the method comprising:
selecting a first excitation surface from a group of a first substrate surface of a substrate and a first movable body surface of a movable body, thereby defining the other surface as a first sensing surface, wherein the sensor device comprises a substrate having the first substrate surface and a second substrate surface parallel to the first substrate surface, and a movable body having the first movable body surface and a second movable body surface parallel to the first movable body surface, the movable body being interconnected with the substrate via one or more suspension anchors and compliant members, the movable body having a first reference axis that coincides with a first centerline of the movable body, the first movable body surface being on a side of the first reference axis opposite to the second movable body surface;
selecting a second excitation surface as the second substrate surface in case the first substrate surface is selected as the first excitation surface or as the second movable body surface in case the first movable body surface is selected as the first excitation surface and thereby defining the other surface as a second sensing surface;
placing, at a first time, the first and second excitation surfaces at a reference voltage;
exciting, at a second time, the first and second excitation surfaces with a first excitation voltage;
measuring a first charge change from the first sensing surface, and a second charge change from the second sensing surface from said placing at the first time to said exciting at the second time;
detecting a first acceleration when the first and second charge changes have a common polarity, the first acceleration being parallel to the first reference axis;
exciting, at a third time, the first excitation surface with a second excitation voltage and the second excitation surface with a third excitation voltage, the third excitation voltage being on an opposite side of the reference voltage compared to the second excitation voltage; and
measuring a third charge change from the first sensing surface, and a fourth charge change from the second sensing surface from said placing at the first time to said exciting at the third time; and
detecting a second acceleration when the third and fourth charge changes have opposite polarities, the second acceleration being perpendicular to first reference axis and parallel to the substrate surface
wherein the movable body is configured to undergo a first displacement relative to the substrate plane, in response to the first acceleration, and the movable body is configured to undergo a second displacement in response to the second acceleration, wherein the first displacement is a translation parallel to the first reference axis, the second displacement is a rotation parallel to the substrate plane, and a pivot axis of said rotation is perpendicular to the substrate.

7. The method according to claim 6, wherein the excitation surfaces are placed at the reference voltage prior to the second excitation.

8. The method according to claim 6, wherein the first excitation voltage and the second excitation voltage are equal.

9. The method according to claim 6, wherein the movable body has a centre of mass placed at a distance from the pivot axis.

10. The method according to claim 6, wherein, when the movable body is not subjected to the first and second accelerations, the first capacitance and the second capacitance are configured to be equal.

11. A method for measuring acceleration using a system comprising a sensor device, the method comprising:
  selecting a first excitation surface from a group of a first substrate surface of a substrate and a first movable body surface of a movable body, thereby defining the other surface as a first sensing surface, wherein the sensor device comprises a substrate having the first substrate surface and a second substrate surface parallel to the first substrate surface, and a movable body having the first movable body surface and a second movable body surface parallel to the first movable body surface, the movable body being interconnected with the substrate via one or more suspension anchors and compliant members, the movable body having a first reference axis that coincides with a first centerline of the movable body, the first movable body surface being on a side of the first reference axis opposite to the second movable body surface;
  selecting a second excitation surface as the second substrate surface in case the first substrate surface is selected as the first excitation surface or as the second movable body surface in case the first movable body surface is selected as the first excitation surface and thereby defining the other surface as a second sensing surface;
  placing, at a first time, the first and second excitation surfaces at a reference voltage;
  exciting, at a second time, the first and second excitation surfaces with a first excitation voltage;
  measuring a first charge change from the first sensing surface, and a second charge change from the second sensing surface from said placing at the first time to said exciting at the second time;
  detecting a first acceleration when the first and second charge changes have a common polarity, the first acceleration being parallel to the first reference axis;
  exciting, at a third time, the first excitation surface with a second excitation voltage and the second excitation surface with a third excitation voltage, the third excitation voltage being on an opposite side of the reference voltage compared to the second excitation voltage;
  measuring a third charge change from the first sensing surface, and a fourth charge change from the second sensing surface from said placing at the first time to said exciting at the third time;
  detecting a second acceleration when the third and fourth charge changes have opposite polarities, the second acceleration being perpendicular to first reference axis and parallel to the substrate surface;
  wherein the movable body is configured to undergo a first displacement relative to the substrate plane, in response to the first acceleration, and wherein the movable body is configured to undergo a second displacement in response to the second acceleration, and wherein:
    the substrate further has a third substrate surface and a fourth substrate surface, the third and fourth substrate surfaces being parallel to the substrate plane;
    the movable body has a second reference axis that coincides with a second centerline of the movable body perpendicular to the first reference axis;
    the movable body has a third movable body surface and a fourth movable body surface, the third movable body surface being parallel to the fourth movable body surface, the third movable body surface being on a side of the second reference axis opposite to the fourth movable body surface; and
  the method further comprises:
  selecting a third and a fourth excitation surface being respectively the third and fourth substrate surfaces in case the first substrate surface is selected as the first excitation surface or otherwise the third and fourth movable body surfaces and thereby defining the other surfaces as respectively a third and a fourth sensing surface, wherein the third substrate surface and the third movable body surface are configured to constitute a third capacitor having a third capacitance, and the fourth substrate surface and the fourth movable body surface are configured to constitute a fourth capacitor having a fourth capacitance;
  placing, at the first time, the third and fourth excitation surfaces at the reference voltage;
  exciting, at the first time, the third and fourth excitation surface with a fourth excitation voltage opposite to the first excitation voltage compared to the reference voltage;
  exciting, at the third time, the third excitation surface with a fifth excitation voltage on an opposite side of the reference voltage compared to the second excitation voltage and the fourth excitation surface with a sixth excitation voltage on a same side of the reference voltage compared to the second excitation voltage;
  measuring a fifth charge change from the third sensing surface, and a sixth charge change from the fourth sensing surface from said placing at the first time to said exciting at the third time; and
  detecting a third acceleration when the fifth and sixth charge changes have opposite polarities, the third acceleration being perpendicular to the substrate surface.

12. A method for measuring acceleration using a system comprising a sensor device, the method comprising:
  selecting a first excitation surface from a group of a first substrate surface of a substrate and a first movable body surface of a movable body, thereby defining the other surface as a first sensing surface, wherein the sensor device comprises a substrate having the first substrate surface and a second substrate surface parallel to the first substrate surface, and a movable body having the first movable body surface and a second movable body surface parallel to the first movable body surface, the movable body being interconnected with the substrate via one or more suspension anchors and compliant members, the movable body having a first reference axis that coincides with a first centerline of the movable body, the first movable body surface being on a side of the first reference axis opposite to the second movable body surface;
  selecting a second excitation surface as the second substrate surface in case the first substrate surface is selected as the first excitation surface or as the second movable body surface in case the first movable body surface is selected as the first excitation surface and thereby defining the other surface as a second sensing surface;

placing, at a first time, the first and second excitation surfaces at a reference voltage;

exciting, at a second time, the first and second excitation surfaces with a first excitation voltage;

measuring a first charge change from the first sensing surface, and a second charge change from the second sensing surface from said placing at the first time to said exciting at the second time;

detecting a first acceleration when the first and second charge changes have a common polarity, the first acceleration being parallel to the first reference axis;

exciting, at a third time, the first excitation surface with a second excitation voltage and the second excitation surface with a third excitation voltage, the third excitation voltage being on an opposite side of the reference voltage compared to the second excitation voltage; and measuring a third charge change from the first sensing surface, and a fourth charge change from the second sensing surface from said placing at the first time to said exciting at the third time; and detecting a second acceleration when the third and fourth charge changes have opposite polarities, the second acceleration being perpendicular to first reference axis and parallel to the substrate surface wherein the movable body is configured to undergo a first displacement relative to the substrate plane, in response to the first acceleration, and the movable body is configured to undergo a second displacement in response to the second acceleration, and wherein the first displacement is a translation parallel to the first reference axis and the second displacement is a translation perpendicular to the first reference axis and parallel to the substrate plane.

* * * * *